(No Model.)

A. H. HOYT.
ELECTRICAL MEASURING INSTRUMENT.

No. 555,702.  Patented Mar. 3, 1896.

Witnesses
Jas. J. Maloney.
H. J. Livermore.

Inventor,
Adrian H. Hoyt,
by Jos. P. Livermore
Att'y.

UNITED STATES PATENT OFFICE.

ADRIAN H. HOYT, OF PENACOOK, NEW HAMPSHIRE, ASSIGNOR TO THE WHITNEY ELECTRICAL INSTRUMENT COMPANY, OF SACO, MAINE.

ELECTRICAL MEASURING-INSTRUMENT.

SPECIFICATION forming part of Letters Patent No. 555,702, dated March 3, 1896.

Application filed June 10, 1895. Serial No. 552,218. (No model.)

*To all whom it may concern:*

Be it known that I, ADRIAN H. HOYT, of Penacook, county of Merrimac, State of New Hampshire, have invented an Improvement in Electrical Measuring-Instruments, of which the following description, in connection with the accompanying drawings, is a specification, like letters on the drawings representing like parts.

The present invention relates to electrical measuring-instruments and is mainly embodied in certain mechanical details adapted to be used with any instrument in which the measurement is taken by noting upon a suitably-calibrated scale the amount of attraction or repulsion developed between a fixed member, such as a solenoid or electromagnet, and a movable member, such as a core or armature, in inductive proximity thereto. In instruments of this kind as heretofore commonly constructed the movable member has been mounted upon a pivot or support of similar nature, thus causing, when the said movable member is a heavy object, such as an armature consisting of a coil of wire, considerable friction, which is a disadvantage since it is desirable that these instruments should be as delicately adjusted as possible in order to note minute variations in current.

In accordance with the present invention the pivotal support for the movable member is entirely done away with, the said member being mounted upon a spring of just sufficient strength to hold the said armature in its normal position, and the said armature is connected with a pointer preferably by a multiplying device, one of novel construction being herein shown and forming part of the invention, so that a very slight variation in the position of the armature will cause the pointer to travel over a suitably-calibrated scale of sufficient length to be readily legible.

A further feature of the present invention consists in providing the pointer with a spring or weight which tends when unopposed to cause it to travel over the said scale away from its normal or zero position, the said spring being of such tension as to substantially balance the spring upon which the armature is supported, so that the said armature moves under the attractive or repellant influence of the current practically without opposition.

Figure 1:
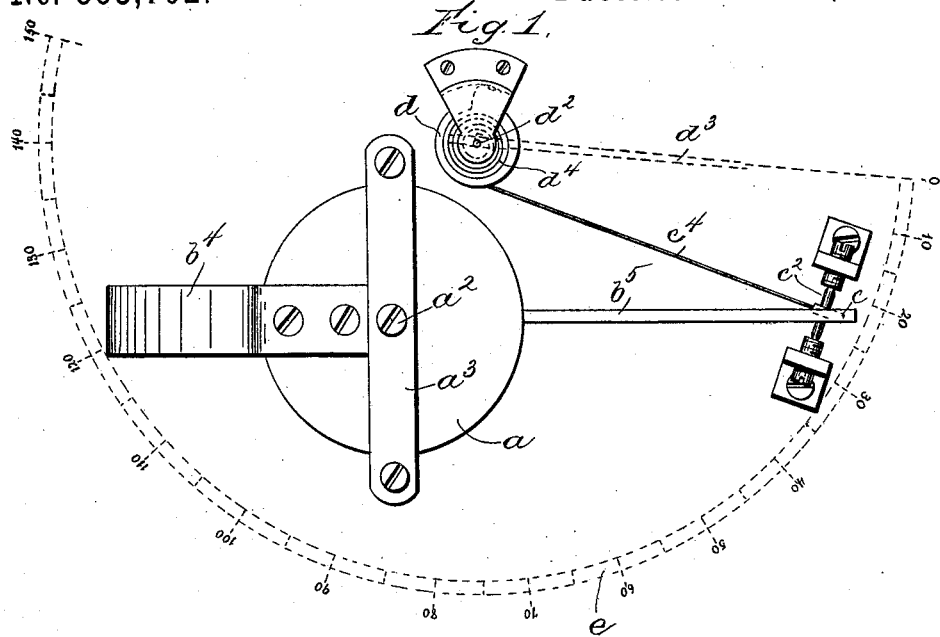
Figure 2:
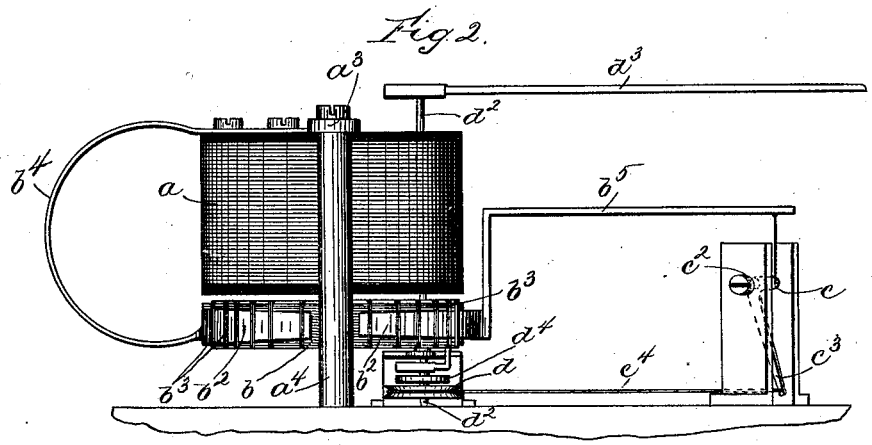
Figure 3:
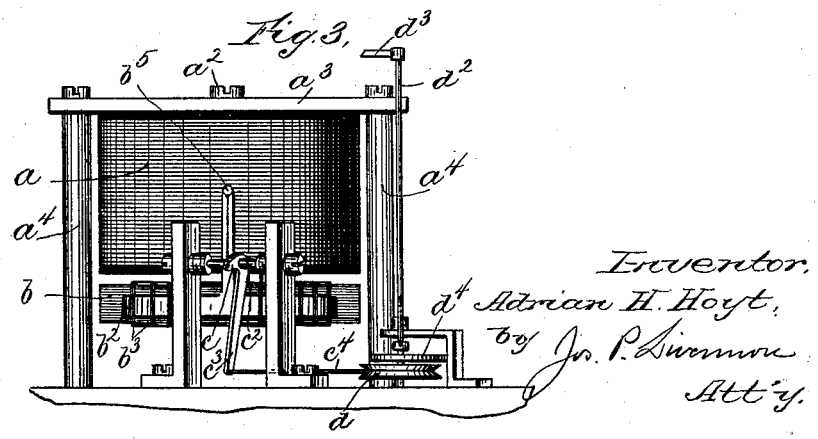

Figure 1 is a top plan view of the working parts of an instrument embodying the present invention. Fig. 2 is a side elevation of the working parts of the instrument, looking toward the lower side as shown in Fig. 1; and Fig. 3 is a similar elevation looking toward the right, Fig. 1.

The fixed member $a$, herein shown as a coil adapted to receive current from the circuit upon which observations are to be taken, may be constructed and mounted in the usual way, and as shown herein is connected by a screw $a^2$ to a yoke $a^3$, mounted on standards $a^4$, the said standards being supported upon the base of the instrument.

The movable member $b$ may be of any suitable construction, but is shown herein as a coil held in a suitable frame $b^2$, to which it is secured by bindings $b^3$. The said movable member or armature is supported in its normal position (shown in Fig. 2) by means of a spring $b^4$, in which position it is in inductive proximity to the coil $a$ and adapted to be attracted or repelled thereby, as the case may be.

The spring $b^4$ is shown as a long bow-shaped spring-arm connected at one end to the armature and at the other end to a stationary portion of the instrument—such, for example, as the coil $a$ or frame which supports it—thus forming not only a support for the armature, but also a guide therefor, whereby the said armature has an angular or tipping movement toward and from the magnet-coil, so that by extending the said armature or an arm or pointer connected thereto a multiplying effect is obtained, there being no frictional resistance to the movement of the armature, so that it responds with extreme accuracy and delicacy to the variations in force in the magnet-coil.

In order that the armature $b$ may be practically balanced—that is to say, so supported that it will move in response to the current practically without mechanical resistance—a force as that of a weight or spring is opposed to the force of the spring-arm $b^4$, thus tending to move the said armature away from its normal position, and the said force is so adjusted as to nearly balance that of the spring $b^4$, which tends to hold the armature $b$ in its normal position, so that when the said armature is repelled by the effect of the electric current it moves practically without opposition.

In order to produce a multiplying effect independent of the specific arrangement of the spring-support for the armature above described, an independent pointer co-operating with a scale is preferably provided and connected with the armature by a multiplying connection of any suitable construction or arrangement, a novel form of multiplying device being herein shown as follows: The armature $b$ is connected by an arm $b^5$ to the short arm $c$ of an elbow-lever pivoted at $c^2$, and having a long arm $c^3$ connected by a cord or chain $c^4$ to the periphery of a drum $d$, mounted on an axis $d^2$, to which is secured one end of the pointer $d^3$, said pointer extending radially therefrom. The said drum is provided with a spring $d^4$, which tends to turn it in the proper direction to carry the outer end of the pointer from the zero-mark on the scale $e$ toward the higher numbers, and the said spring is so adjusted as to exactly balance the force exerted by the spring $b^4$, which holds the armature in position. When current flows through the coil $a$, therefore, the force of attraction or repulsion is exerted upon the armature $b$, said armature being herein shown as repelled, thereby causing the arm $b^5$ to move downward, thus correspondingly relieving the strain on the lever $c\ c^3$, and allowing the drum $d$ to turn upon its axis in response to its spring $d^4$ and carry the outer end of the pointer along the scale to indicate in units of electrical measurement the effect of the current flowing through the said electromagnet.

While any form of spring-support or multiplying connection might obviously be used without departing from the spirit of the invention, the specific combination herein shown is especially practicable, since it is well adapted for symmetrical arrangement in a small circular casing such as is commonly used with this form of instrument, and such construction, moreover, affords three distinct multiplying elements involving the use of only two sets of bearings, which are pivotal, there being no lost motion throughout. The first element is the arm $b^5$, which is connected directly to the armature and which may be made of any length desired to multiply the effect of the movement of the armature, but which is preferably of such length as to fit within the case, while the second multiplying element is the elbow-lever, which, as shown herein, not only serves as an additional multiplying device, but also as a means for changing the direction of movement of the armature, so that the said movement may be transmitted to a pointer mounted at the center of the instrument, and the third multiplying element is the drum and chain, the multiplying effect of which depends upon the diameter of the drum itself. The lever and drum are preferably mounted on jewels, and the arrangement, as shown in Fig. 1, is such that a small compact circular instrument may be made, or even semicircular, if desired, since all the parts can be arranged practically within the space afforded thereby. It is obvious, moreover, that the arm $b^5$ may be shortened if necessary and the multiplying effect lost by such shortening made up either through the lever $c\ c^2$ or the drum $d$.

By the use of this instrument a clearly-legible scale may be produced within a very small space and with a very slight movement of the armature, while the pivotal bearing or support for the said armature commonly heretofore employed is entirely dispensed with and only two bearings of any kind employed in the instrument, thus affording great delicacy and precision.

It is not intended to limit the invention specifically to the form herein shown, since modifications might obviously be made without departing from the invention.

I claim—

1. In an electrical measuring-instrument, the combination with the stationary member, of a movable member, a spring-arm forming the sole support and guide for said movable member, and a pointer connected with said movable member and adapted to travel over a graduated scale, substantially as described.

2. In an electrical measuring-instrument, the combination with a stationary member, of a movable member spring-supported in inductive proximity thereto, a pointer connected with said movable member and adapted to travel over a graduated scale, and a spring or weight adapted to move the said pointer from its initial position with relation to said scale, substantially as described.

3. In an electric measuring-instrument, the combination with a spring-supported armature, of a pointer adapted to travel over a suitably-calibrated scale, and a multiplying connection between said armature and pointer, substantially as described.

4. The combination with a fixed electromagnetic coil and an armature supported by a spring in inductive proximity thereto, of a lever connected with said armature, a spring-actuated drum having its periphery connected with said lever, and a pointer connected with said drum and adapted to travel over a graduated scale, as and for the purpose described.

In testimony whereof I have signed my name to this specification in the presence of two subscribing witnesses.

ADRIAN H. HOYT.

Witnesses:
DAVID F. DUDLEY,
BLANCHE L. DUDLEY.